United States Patent [19]

Otaki et al.

[11] Patent Number: 5,717,520

[45] Date of Patent: Feb. 10, 1998

[54] INTERMEDIATE LENS BARREL FOR MICROSCOPE

[75] Inventors: Tatsuro Otaki; Yumiko Ochi, both of Tokyo, Japan

[73] Assignee: Nikon Corporation, Tokyo, Japan

[21] Appl. No.: 679,762

[22] Filed: Jul. 10, 1996

[30] Foreign Application Priority Data

Jul. 10, 1995 [JP] Japan ................... 7-198193

[51] Int. Cl.[6] .................................................. G02B 21/04

[52] U.S. Cl. ........................... 359/368; 359/431; 359/434; 359/861

[58] Field of Search .................................... 359/368, 380, 359/431, 434, 435, 503, 861

[56] References Cited

U.S. PATENT DOCUMENTS

| | | | |
|---|---|---|---|
| 4,189,213 | 2/1980 | Iizuka | 350/184 |
| 4,252,410 | 2/1981 | Jain | 359/861 |
| 4,650,295 | 3/1987 | Terasawa | 350/425 |
| 4,657,351 | 4/1987 | Mori | 350/427 |
| 5,191,476 | 3/1993 | Sato | 359/687 |
| 5,272,564 | 12/1993 | Suzuki et al. | 359/676 |
| 5,325,233 | 6/1994 | Nakatsuji et al. | 359/684 |
| 5,331,457 | 7/1994 | Hanzawa et al. | 359/380 |

FOREIGN PATENT DOCUMENTS

| | | | |
|---|---|---|---|
| 2409706 | 9/1974 | Germany | 359/434 |
| 60-120312 | 6/1985 | Japan | |
| 62-65009 | 3/1987 | Japan | |
| 06-214165 | 8/1994 | Japan | |
| 07-333512 | 12/1995 | Japan | |

OTHER PUBLICATIONS

Zeiss Catalog, "Variously changeable of the optical path and quantity of light depending on purposes of the microscope", published date unknown, pp. 2–14. (Partial translation).

*Primary Examiner*—Jon W. Henry
*Attorney, Agent, or Firm*—Foley & Lardner

[57] ABSTRACT

An intermediate lens barrel for a microscope, in which an image is formed only once, the direction of the image does not change when returning to the original optical path, and no pupil aberration occurs. In this intermediate lens barrel, assuming that its round optical path is formed by n pieces of reflecting surfaces R (n being an even number not smaller than 4), an intermediate image is formed once in the round optical path, the angle formed by the normal $N_1$ of the first reflecting surface $R_1$ and the normal $N_2$ of the second reflecting surface $R_2$ with respect to each other when projected onto a plane orthogonal to the optical axis $X_1$ reflected by the first reflecting surface $R_1$ is $\alpha_1$, the angle formed by the normal $N_N$ of the reflecting surface $R_N$ and the normal $N_1$ of the reflecting surface $R_1$ with respect to each other when projected onto a plane orthogonal to the optical axis $X_N$ reflected by the reflecting surface $R_N$ is $\alpha_N$, the relationship:

$$(\alpha_1+\alpha_3+\ldots+\alpha_{N-1})-(\alpha_2+\alpha_4+\ldots+\alpha_N)=180°++360°\times n \text{ (n being an integer)}$$

is satisfied.

10 Claims, 11 Drawing Sheets

INTERMEDIATE LENS BARREL FOR MICROSCOPE

BACKGROUND OF THE INVENTION

1. Field of the Invention

The present invention relates to an intermediate lens barrel used for a microscope.

2. Related Background Art

Since early days, zoom type intermediate variable power systems in the conventional microscopes have been used in inverted microscopes in which optical paths are drawn around in a long path. In intermediate lens barrels for erecting microscopes, however, the zoom type intermediate variable power systems have been put into practice just recently. In this case, there has been known a system having a round optical path in order to improve its systematicness and increase its optical path length.

Figure 1:
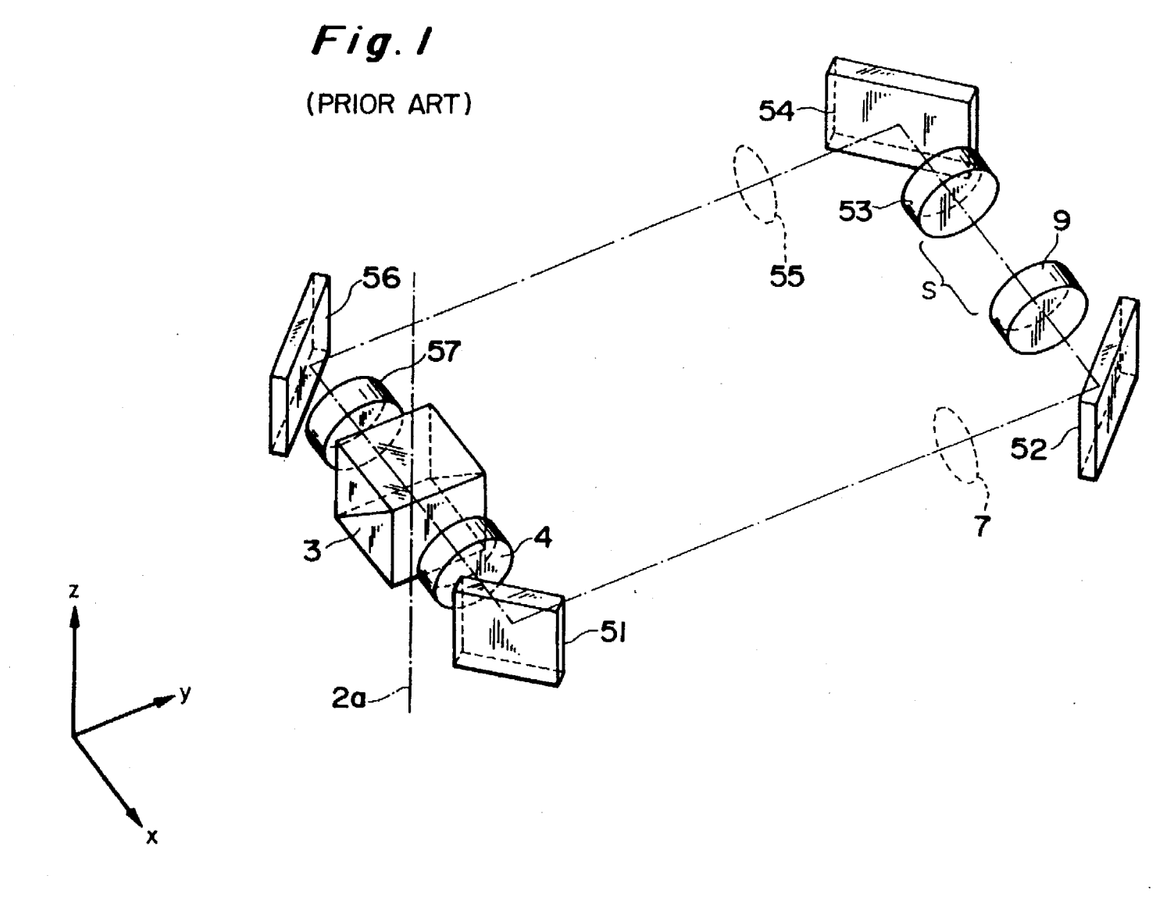
FIG. 1 is a perspective view showing a configuration of a first conventional example.

FIG. 1 shows a conventional example of the intermediate lens barrel using such a round optical path. An optical axis $2a$ of an objective lens (not depicted) is disposed in a vertical direction (z direction in the drawing), while a prism 3 is disposed on this optical axis $2a$, whereby a luminous flux from the objective lens is reflected by a surface of the reflecting interface of the prism 3 so as to enter a round optical path in the horizontal direction. In the round optical path, the luminous flux initially proceeds in +x direction to pass through an imaging lens 4 and then, after being turned to +y direction by a mirror 51, forms an intermediate image 7. Then, the luminous flux is turned to −x direction by a mirror 52 so as to pass through a collimator lens 9 and further through a zoom lens (not depicted) and a second imaging lens 53. Subsequently, the luminous flux is turned to −y direction by a mirror 54 and then forms a second intermediate image 55. Thereafter, the luminous flux is turned to +x direction by a mirror 56 and then passes through a second collimator lens 57 so as to be made incident on the rear surface of the reflecting interface of the prism 3, thereby completing the round optical path and returning to the original optical axis $2a$.

Figure 2:
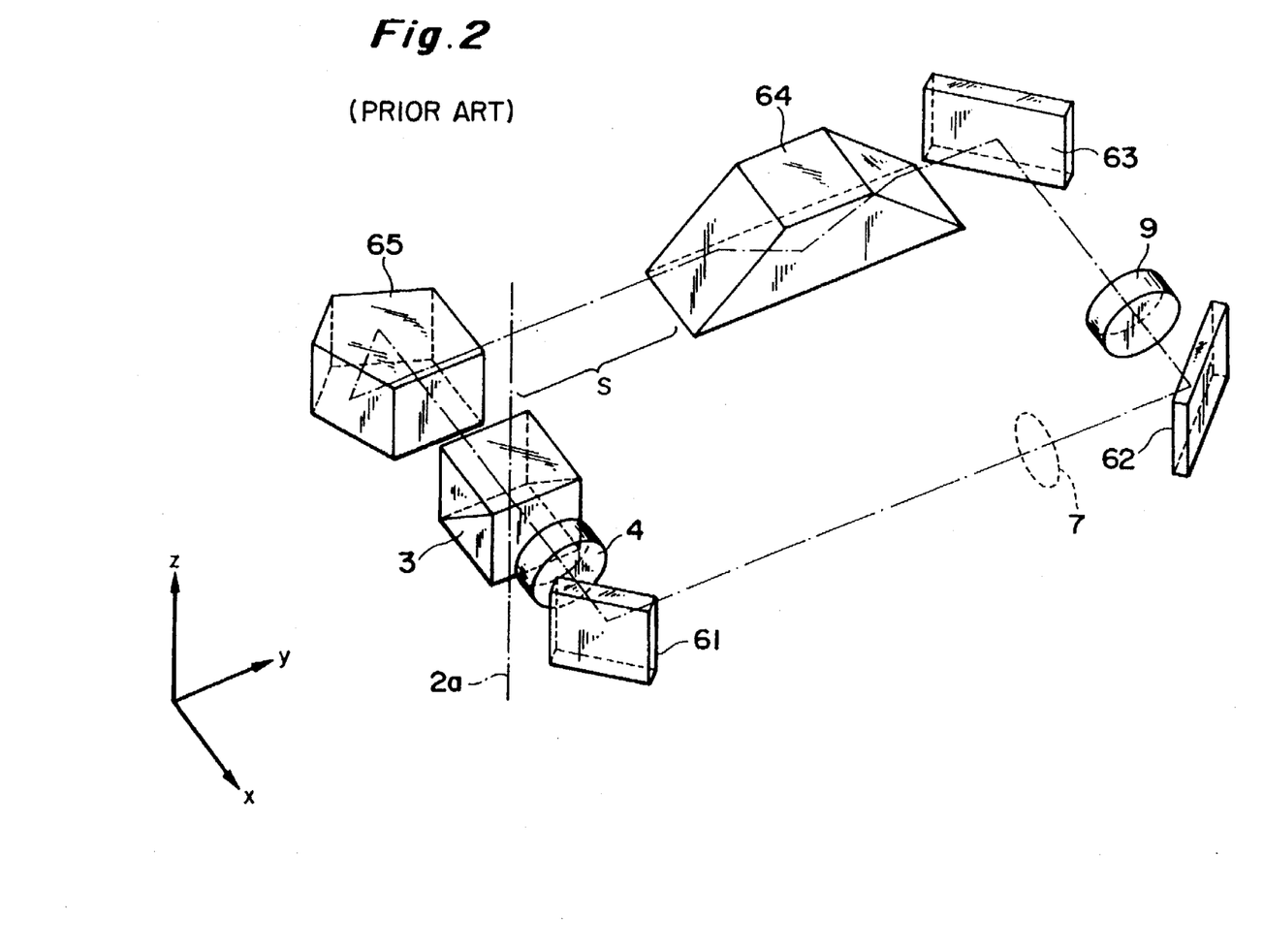
FIG. 2 is a perspective view showing a configuration of a second conventional example.

FIG. 2 shows another conventional example of an intermediate lens barrel using a round optical path. In the round optical path, a luminous flux initially proceeds in +x direction so as to pass through the imaging lens 4 and then, after being turned to +y direction by a mirror 61, forms the intermediate image 7. Subsequently, the luminous flux is turned to −x direction so as to pass through the collimator lens 9 and then turned to −y direction by a mirror 63. Subsequently, the luminous flux is refracted at the inlet surface of a Dove prism 64, which functions as an image rotator, totally reflected within the Dove prism 64, and then refracted at the exit surface of the Dove prism 64. Thereafter, the luminous flux passes through a zoom lens (not depicted) and then is reflected twice within a pentaprism 65 so as to turn to +x direction, thereby completing the round optical path.

As another kind of the prior art, there has been a variable power optical system disclosed in Japanese Unexamined Patent Publication No. 7-333,512. This variable power optical system is installed in a parallel luminous flux of a microscope so as to change the magnification of an object to be observed.

Further, as another kind of the prior art, there has been a microscope system called "Axiomat" which is disclosed in a catalog of Carl Zeiss Co., Ltd.

SUMMARY OF THE INVENTION

The object of the present invention is to provide an intermediate lens barrel for a microscope, in which an image is formed only once, the direction of the image does not change when returning to the original optical path, and pupil aberration does not occur.

The present invention is achieved in order to attain the above-mentioned object and relates to an intermediate lens barrel in which an optical path is drawn into the intermediate lens barrel by a first reflecting surface disposed on the optical axis of an objective lens of a microscope, circulated through the intermediate lens barrel, and then made incident on the last reflecting surface so as to return to the original optical path of the objective lens. The intermediate lens barrel of the present invention is configured such that, assuming that its round optical path is formed by n pieces of reflecting surfaces (n being an even number not smaller than 4), an intermediate image is formed once in the round optical path, the optical axis reflected by the first reflecting surface is $X_1$, the normal of the first reflecting surface is $N_1$, the normal of the second reflecting surface is $N_2$, the angle formed by the normals $N_1$ and $N_2$ with respect to each other when they are projected onto a plane orthogonal to the optical axis $X_1$ is $\alpha_1$ in the clockwise direction observed from the exit side of the optical axis $X_1$, the optical axis reflected by the second reflecting surface is $X_2$, the normal of the third reflecting surface is $N_3$, the angle formed by the normals $N_2$ and $N_3$ with respect to each other when they are projected onto a plane orthogonal to the optical axis $X_2$ is $\alpha_2$ in the clockwise direction observed from the exit side of the optical axis $X_2$, . . . , the optical axis reflected by the (N−1)-th reflecting surface is $X_{N-1}$, the optical axis reflected by the N-th reflecting surface is $X_N$, the normal of the (N−1)-th reflecting surface is $N_{N-1}$, the normal of the N-th reflecting surface is $N_N$, and the angle formed by the normals $N_{N-1}$ and $N_N$ with respect to each other when they are projected onto a plane orthogonal to the optical axis $X_N$ is $\alpha_N$ in the clockwise direction observed from the exit side of the optical axis $X_N$, the following relationship:

$$(\alpha_1+\alpha_3+ \ldots +\alpha_{N-1})-(\alpha_2+\alpha_4+ \ldots +\alpha_N)=180°+360°\times n \text{ (n being an integer)}$$

Further, the initial reflecting surface, which is the first reflecting surface, and the last reflecting surface, which is the N-th reflecting surface, can be disposed in parallel to each other while their normals are directed opposite to each other. In this case, it becomes:

$$\alpha_N=180$$

Accordingly, the lens barrel is configured so as to attain the following relationship:

$$(\alpha_1+\alpha_3+ \ldots +\alpha_{N-1})-(\alpha_2+\alpha_4+ \ldots +\alpha_{N-2})=360°\times n$$

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the above-mentioned configuration of FIG. 1, since the round optical path is on the same plane, in order to prevent the direction of an image from changing when returning to the original optical path $2a$ of the objective lens, the image must be formed an even number of times, i.e., at least twice, in the round optical path. In this case, since a space S for the zoom optical system is limited, the zoom ratio has been limited thereby. Namely, in order to increase the space S for the zoom optical system, the width of the intermediate lens barrel must be made large when the zoom optical system is disposed in x direction as shown in FIG. 1, whereas the depth of the intermediate lens barrel must be made large when the zoom optical system is disposed in y direction. Both of these arrangements are, however, impractical. Also, as the number of imaging operations is larger, the number of the lenses necessary for relaying increases, thereby deteriorating the image in terms of flare, ghost, and the like.

On the other hand, although the configuration of FIG. 2 is preferable in that the image is formed only once, pupil aberration tends to occur due to the use of the image rotator, which adjusts the direction of the image by means of refraction of light, whereby this configuration has not been feasible in biological microscopes, which perform phase difference observation and the like.

In the following, assuming that a beam proceeds along an optical path and that a spot P is fixed on the circumference of the beam, how the position of the spot P changes in the circumferential direction of the beam will be studied (see FIGS. 3 to 6). A reference for measuring the direction of the spot P will be determined as follows. Namely, by an incident plane including an axial center of an incident beam a, an axial center of a reflected beam b, and a normal N of a reflected surface R, the beams a and b are cut. While thus cut cross section corresponds to the diameter of the beams a and b, of the two radii constituting this diameter, one which is on the normal N side is used as the reference. Namely, the angle is measured from this radius toward the spot P, while the clockwise direction observed from the direction opposite to the beam advancing direction is defined as positive.

It is assumed that the direction of the spot P is measured according to the foregoing definitions and that, for simplification, total number N (wherein N is an even number not smaller than 4) of the reflecting surfaces is 8.

Figure 3:
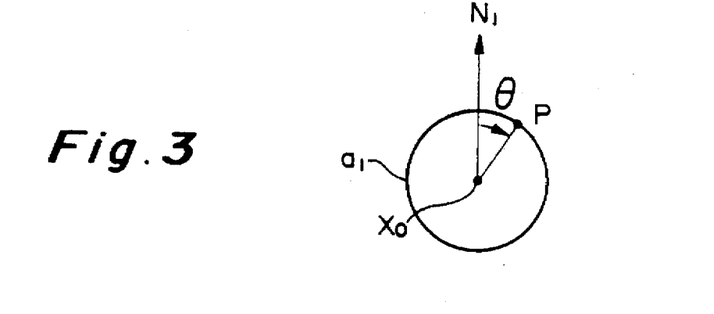
FIGS. 3 to 6 are views explaining changes in direction of an image.
Figure 4:
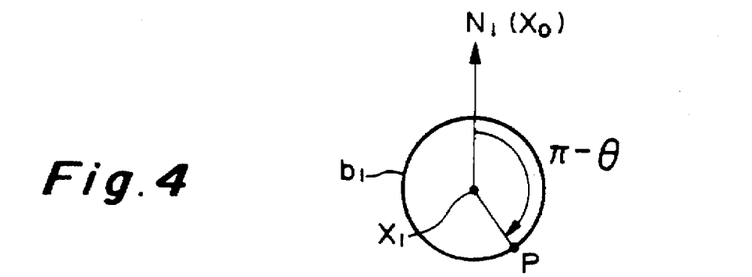

When, as shown in FIG. 3, the direction of the spot P in an incident beam $a_1$ incident on a first reflecting surface $R_1$ along an optical axis $X_0$ is defined as $\theta$, namely:

$$\text{incident light on } R_1: \theta \tag{1a}$$

the direction of the spot P in a reflected beam $b_1$ reflected from the first reflecting surface $R_1$ along an optical axis $X_1$ becomes:

$$\text{reflected light from } R_1: \pi-\theta \tag{1b}$$

as shown in FIG. 4.

While this reflected beam $b_1$ from the first reflecting surface $R_1$ becomes an incident beam $a_2$ on a second reflecting surface $R_2$, normals $N_1$ and $N_2$ on which these beams $b_1$ and $a_2$ are respectively based differ from each other. Accordingly, a projection plane orthogonal to the optical axis $X_1$ between the first reflecting surface $R_1$ and the second reflecting surface $R_2$ is provided. Then, on this projection plane, the normal $N_1$ of the first reflecting surface $R_1$ and the normal $N_2$ of the second reflecting surface $R_2$ are projected, and the angle formed by thus projected normals $N_1$ and $N_2$ with respect to each other is measured.

Here, since the above-mentioned projection surface is orthogonal to the incident plane of the first reflecting surface $R_1$, the direction of the normal $N_1$ of the first reflecting surface $R_1$ projected onto this projection surface is the same as the direction of the optical axis $X_0$ incident on the first reflecting surface $R_1$. Similarly, since this projection surface is also orthogonal to the incident plane of the second reflecting surface $R_2$, the direction of the normal $N_2$ of the second reflecting surface $R_2$ projected onto this projection surface is the same as the direction of an optical axis $X_2$ reflected by the second reflecting surface $R_2$. Accordingly, instead of projecting the normals $N_1$ and $N_2$, the optical axis $X_0$ incident on the first reflecting surface $R_1$ and the optical axis $X_2$ reflected by the second reflecting surface $R_2$ may be projected, and the angle formed by thus projected optical axes $X_0$ and $X_2$ with respect to each other may be measured.

Also, in this method, the angle is measured from the direction of projection of the normal $N_1$ of the first reflecting surface $R_1$, i.e., the direction of projection of the optical axis $X_0$ immediately prior thereto, toward the direction of projection of the normal $N_2$ of the second reflecting surface $R_2$, i.e., the direction of projection of the optical axis $X_2$ immediately thereafter, while the clockwise direction observed from the direction opposite to the advancing direction of the optical axis $X_1$ is defined as positive.

More simply, the subject optical axis $X_1$ and the optical axis $X_0$ immediately prior thereto are unitedly rotated around the subject optical axis $X_1$ as the axial center, while the angle of rotation at which the optical axis $X_0$ immediately prior thereto and the optical axis $X_2$ immediately thereafter appear to overlap each other when observed from the direction of the subject optical axis $X_1$ is measured.

Figure 5:
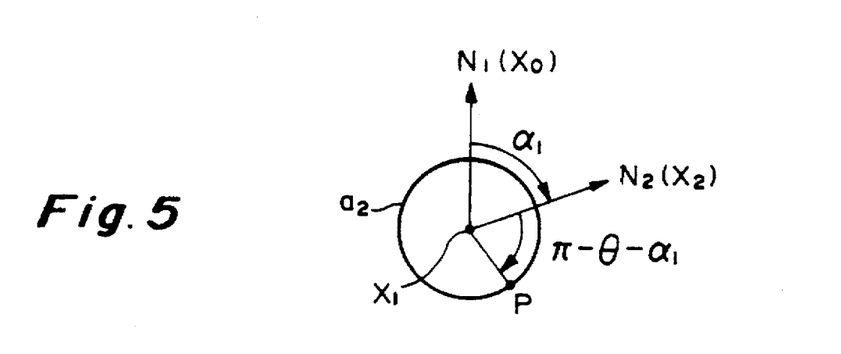

Assuming that thus determined angle is $\alpha_1$, as shown in FIG. 5, the normal $N_2$, which is used as the reference for the incident beam $a_2$ on the second reflecting surface $R_2$, advances from the normal $N_1$, which is used as the reference for the reflected beam $b_1$ from the first reflecting surface $R_1$ by the angle $\alpha_1$ in the clockwise direction. Accordingly, the direction of the spot P in the incident beam $a_2$ on the second reflecting surface $R_2$ is:

$$\text{incident light on } R_2: \pi-\theta-\alpha_1 \tag{2a}$$

Figure 6:
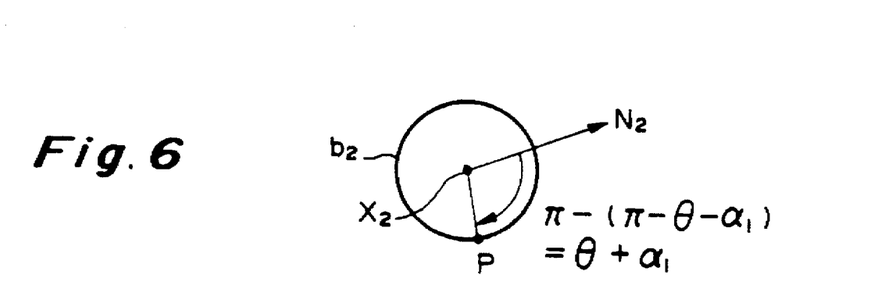

Subsequently, the foregoing steps are repeated. Namely, as shown in FIG. 6, the direction of the spot P in the reflected beam $b_2$ from the second reflecting surface $R_2$ is obtained when expression (2a) is subtracted from $\pi$ as follows:

reflected light from $R_2$: $\pi-(\pi-\theta-\alpha_1)=\theta+\alpha_1$ (2b)

Then, for the incident beam on the third reflecting surface $R_3$, angular change $\alpha_2$ generated in the optical axis $X_2$ between the second reflecting surface $R_2$ and the third reflecting surface $R_3$ is subtracted from expression (2b) as follows:

incident light on $R_3$: $\theta+\alpha_1-\alpha_2$ (3a)

For the reflected beam from the third reflecting surface $R_3$, expression (3a) is subtracted from $\pi$ as follows:

reflected light from $R_3$: $\pi-(\theta+\alpha_1-\alpha_2)$ (3b)

When the spot P in the incident beam on each reflecting surface R and the direction of the spot P in its corresponding reflected beam are subsequently determined in the same manner, the results shown in Table 1 are obtained.

TABLE 1

| Surface No. | Incident/ Reflected | Angle |
|---|---|---|
| 1 | Incident | $\theta$ |
|   | Reflected | $\pi - \theta$ |
| 2 | Incident | $\pi - (\theta + \alpha_1)$ |
|   | Reflected | $\theta + \alpha_1$ |
| 3 | Incident | $\theta + \alpha_1 - \alpha_2$ |
|   | Reflected | $\pi - (\theta + \alpha_1 - \alpha_2)$ |
| 4 | Incident | $\pi - (\theta + \alpha_1 - \alpha_2 + \alpha_3)$ |
|   | Reflected | $\theta + \alpha_1 - \alpha_2 + \alpha_3$ |
| 5 | Incident | $\theta + \alpha_1 - \alpha_2 + \alpha_3 - \alpha_4$ |
|   | Reflected | $\pi - (\theta + \alpha_1 - \alpha_2 + \alpha_3 - \alpha_4)$ |
| 6 | Incident | $\pi - (\theta + \alpha_1 - \alpha_2 + \alpha_3 - \alpha_4 + \alpha_5)$ |
|   | Reflected | $\theta + \alpha_1 - \alpha_2 + \alpha_3 - \alpha_4 + \alpha_5$ |
| 7 | Incident | $\theta + \alpha_1 - \alpha_2 + \alpha_3 - \alpha_4 + \alpha_5 - \alpha_6$ |
|   | Reflected | $\pi - (\theta + \alpha_1 - \alpha_2 + \alpha_3 - \alpha_4 + \alpha_5 - \alpha_6)$ |
| 8 | Incident | $\pi - (\theta + \alpha_1 - \alpha_2 + \alpha_3 - \alpha_4 + \alpha_5 - \alpha_6 + \alpha_7)$ |
|   | Reflected | $\theta + \alpha_1 - \alpha_2 + \alpha_3 - \alpha_4 + \alpha_5 - \alpha_6 + \alpha_7$ |
| 1 | Incident | $\theta + \alpha_1 - \alpha_2 + \alpha_3 - \alpha_4 + \alpha_5 - \alpha_6 + \alpha_7 - \alpha_8$ |

Here, the direction of the beam spot emitted from the objective lens, i.e., the direction $\theta$ of the spot incident on the first reflecting surface $R_1$, should not change between the case where the first reflecting surface $R_1$ and the last reflecting surface $R_8$ are removed outside of the optical path such that the luminous flux is not introduced into the round optical path and the case where these reflecting surfaces $R_1$ and $R_8$ are inserted into the optical path so as to introduce the luminous flux into the round optical path. Accordingly, the direction of the spot reflected by the last reflecting surface $R_8$ must be the same as the direction $\theta$ of the spot incident on the first reflecting surface $R_1$.

On the other hand, the direction of the spot in each reflecting surface R is measured not by a universal coordinate system but with reference to the normal N of the subject reflecting surface R. Accordingly, the direction of the spot reflected by the last reflecting surface $R_8$ cannot directly be compared with the direction $\theta$ of the spot incident on the first reflecting surface $R_1$. The bottom row of Table 1 is provided for evaluating the direction of the spot reflected by the last reflecting surface $R_8$ with the same reference as that of the first reflecting surface $R_1$. In this row, $\alpha_8$ is an angle formed by the normal $N_8$ of the last reflecting surface $R_8$ and the normal $N_1$ of the first reflecting surface $R_1$ with respect to each other when they are projected on a plane orthogonal to an optical axis $X_8$ reflected by the last reflecting surface $R_8$. When this angular change $\alpha_8$ is subtracted from the direction of the spot reflected by the last reflecting surface $R_8$ the direction of the spot reflected by the last reflecting surface $R_8$ can be evaluated with the same reference as that of the first reflecting surface $R_1$.

Here, as mentioned above, while the angular change occurring in the optical axis $X_i$ between the successively adjacent reflecting surfaces $R_i$ and $R_{i+1}$ is determined by the difference between projection directions of the respective normals $N_i$ and $N_{i+1}$ of these reflecting surfaces, the projection directions of the optical axis $X_{i-1}$ immediately prior thereto and the optical axis $X_{i+1}$ immediately thereafter may also be used instead of the projection directions of these normals. However, the last reflecting surface $R_8$ and the first reflecting surface $R_1$ are not successively adjacent to each other.

Here, when a reflecting surface which, together with its normal, is in parallel to the first reflecting surface $R_1$ is virtually provided on the optical axis $X_8$ emitted from the last reflecting surface $R_8$, the reference for the spot direction in this virtual reflecting surface becomes identical to that in the first reflecting surface. Since the direction of the optical axis $X_0$ incident on the first reflecting surface $R_1$ is in parallel to the direction of the optical axis $X_8$, which is reflected by the last reflecting surface $R_8$ and then made incident on the virtual reflecting surface, the reflected optical axis from this virtual reflecting surface is in parallel to the direction of the first optical axis $X_1$. Accordingly, in order to observe the above-mentioned angular change $\alpha_8$ with reference to the direction of the optical axis, $X_8$ or $X_0$ is used as the subject optical axis, $X_7$ is used as the optical axis immediately prior thereto, and the first optical axis $X_1$ is used as the optical axis immediately thereafter.

When the direction of the spot reflected by the last reflecting surface $R_8$ is thus evaluated with the same reference as that of the first reflecting surface $R_1$, the direction of the spot should be maintained. Accordingly, from Table 1, it is necessary to satisfy the following relationship:

$\theta=(\theta+\alpha_1-\alpha_2+\alpha_3-\alpha_4+\alpha_5-\alpha_6+\alpha_7-\alpha_8)+2\pi n$ *(wherein n is an integer)* namely:

$(\alpha_1+\alpha_3+\alpha_5+\alpha_7)-(\alpha_2+\alpha_4+\alpha_6+\alpha_8)=360°\times n$ When this relationship is established, the direction of the spot incident on the eyepiece lens is maintained regardless of whether the luminous flux is introduced in the round optical path or not.

Here, the image is formed only once in the round optical path and the direction of the spot advances by 180° upon a vertical and horizontal inversion due to this one imaging operation. When, in order to cancel this phenomenon, the configuration is made such that the following relationship:

$(\alpha_1+\alpha_3+\alpha_5+\alpha_7)-(\alpha_2+\alpha_4+\alpha_6+\alpha_8)=180°+360°\times n$ (4)

is established, the direction of the image can be maintained without the aid of refraction of light, while the image is formed only once.

Figure 7:
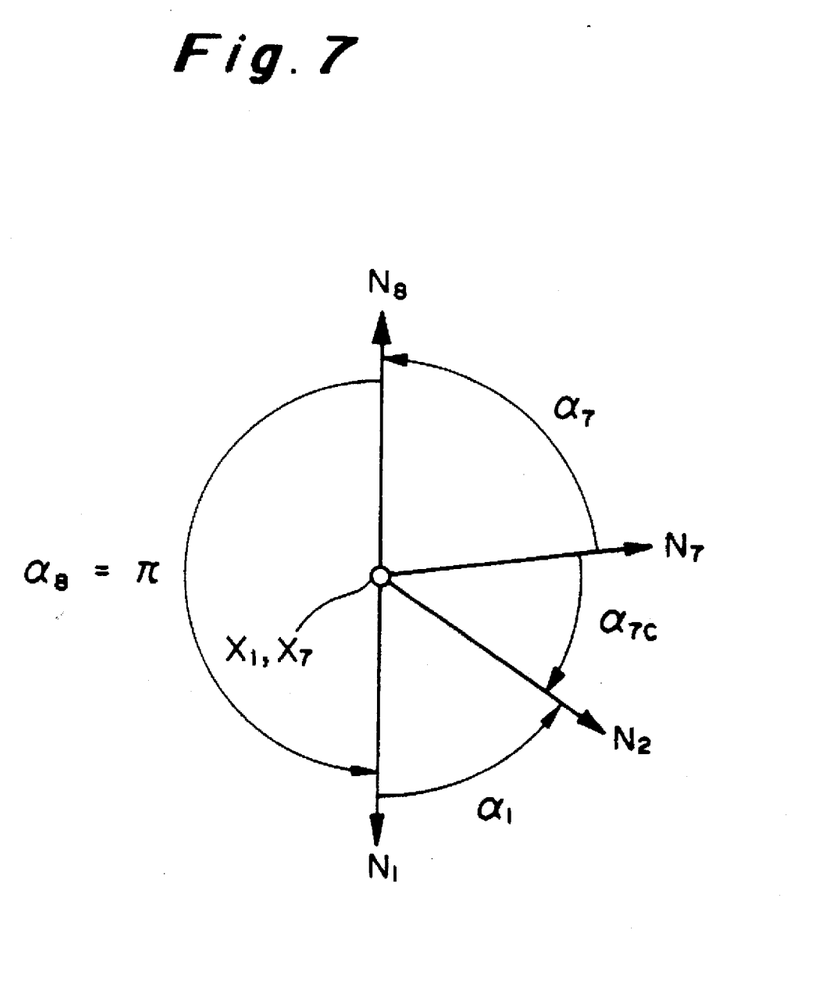
FIG. 7 is a view explaining an angular change between the first and last reflecting surfaces when they are in parallel to each other.

Although the above-mentioned expression (4) is the general formula in accordance with the present invention; in many cases, in order to keep the eye point of the eyepiece lens low, the last reflecting surface $R_8$ and the first reflecting surface $R_1$ are disposed in parallel to each other while their normals $R_8$ and $R_1$ are inverted by 180° with respect to each other. In this case, as shown in FIG. 7, the angular change $\alpha_8$ generated between the reflecting surfaces $R_8$ and $R_1$ is $\alpha_8=180°$. Since increments and decrements by 360° are not significant, the sign may be any of plus and minus in the case where the angle changes by 180°. Accordingly, expression (4) becomes:

$$(\alpha_1+\alpha_3+\alpha_5+\alpha_7)-(\alpha_2+\alpha_4+\alpha_6)=360°\times n$$

Further, since the optical axis $X_8$ from the last reflecting surface $R_8$ is in parallel to the optical axis $X_0$ onto the first reflecting surface $R_1$, the optical axis $X_7$ onto the last reflecting surface $R_8$ and the optical axis $X_1$ from the first reflecting surface $R_1$ are also in parallel to each other.

Therefore, in a configuration from which the first reflecting surface $R_1$ and the last reflecting surface $R_8$ have been eliminated, when the reflected light from the penultimate reflecting surface, i.e., from the seventh reflecting surface $R_7$, is made incident on the reflecting surface next to the first reflecting surface, i.e., the second reflecting surface $R_2$, an angular change $\alpha_{7C}$ occurring between these reflecting surfaces $R_7$ and $R_2$ will be studied. As shown in FIG. 7, when the normal $N_1$ of the first reflecting surface $R_1$, the normal $N_2$ of the second reflecting surface $R_2$, the normal $N_7$ of the seventh reflecting surface $R_7$, and the normal $N_8$ of the last reflecting surface $R_8$ are projected onto a projection plane perpendicular to the optical axes $X_7$ and $X_1$ between the reflecting surfaces $R_7$ and $R_2$, the following relationship:

$$\alpha_1-\alpha_{7C}+\alpha_7=\pm 180°$$

is established. Accordingly, the above-mentioned expression (4) becomes:

$$(\alpha_2+\alpha_4+\alpha_6)-(\alpha_3+\alpha_5+\alpha_{7C})=180°+360°\times n \quad (5)$$

Namely, when the first reflecting surface $R_1$ and the last reflecting surface $R_8$ are in parallel to each other, without these reflecting surfaces $R_1$ and $R_8$ being taken into account, the beam reflected by the penultimate reflecting surface $R_7$ may be regarded as the incident beam onto the second reflecting surface $R_2$, and the configuration may be made such that the above-mentioned expression (5) is established while the angular change $\alpha_{7C}$ generated between these reflecting surfaces $R_7$ and $R_2$ is adopted therein.

Here, as shown in Table 1, the coefficient for $\theta$ in the reflected beams from the respective reflecting surfaces R alternately becomes +1 and −1 as the reflecting surface advances one by one. Accordingly, upon each reflection, a clockwise rotated image is converted into a counterclockwise rotated image, whereas a counterclockwise rotated image is converted into a clockwise rotated image. Namely, as is well known, the total number N of the reflecting surfaces must be an even number.

Also, in the above-mentioned expression (4) or (5), since the direction of the spot advances by 180° upon one imaging operation, the direction of the spot is advanced by 180° with the reflecting surfaces of the round optical path so as to cancel it. In order to satisfy each of these expressions, the round optical path should be configured three-dimensionally. If the round optical path is disposed on the same plane, no configuration can satisfy each expression. When the round optical path is disposed on the same plane, a spot placed above the same plane is always on the upper side, whereas a spot placed below the same plane is always on the lower side, whereby the direction of the spot cannot be advanced by 180°.

Namely, in the present invention, the round optical path is configured three-dimensionally, whereby the direction of the image does not change even when the number of imaging operations is reduced. As a result, the number of necessary relay lenses is reduced, a large space for the zoom optical system can be secured, and an intermediate variable power with a large zoom ratio can be designed.

An example for three-dimensionally constituting the round optical path is configured such that at least one portion in parallel to the optical axis of the objective lens is provided in the optical axis of the round optical path. Nevertheless, such a configuration may not be effected as long as each of the above-mentioned expressions is satisfied.

Figure 8:
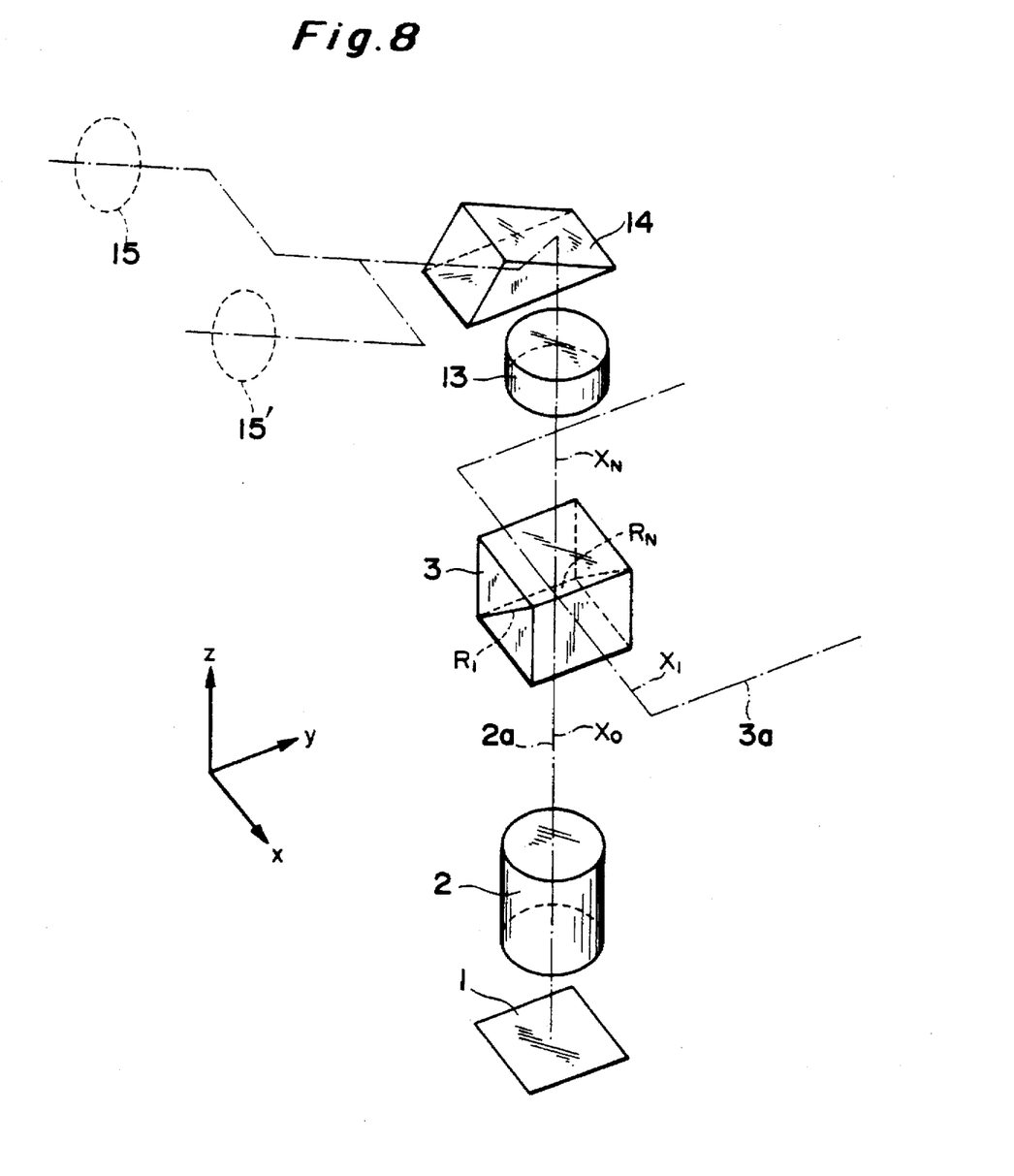
FIG. 8 is a view showing a schematic configuration of a microscope to which the present invention is applied.

FIG. 8 shows an example of a microscope body to which an intermediate lens barrel in accordance with the present invention is applied. Above a sample 1, an infinity type first objective lens 2 is disposed, whereas a prism 3 is detachably disposed above the first objective lens 2. Parallel light from the first objective lens 2 passes through an optical axis 2a of the first objective lens 2 so as to reach the prism 3 and is reflected by the first reflecting surface $R_1$ provided in the prism 3, thereby entering a round optical path 3a. The luminous flux that has circulated around the round optical path 3a is made incident on the last reflective surface $R_N$, which is provided in the prism 3, and reflected thereby so as to return to the original optical axis 2a. Thereafter, the luminous flux passes through a second objective lens 13 and, by way of a faced-down prism 14, forms a pair of observation images 15 and 15'.

Figure 9:
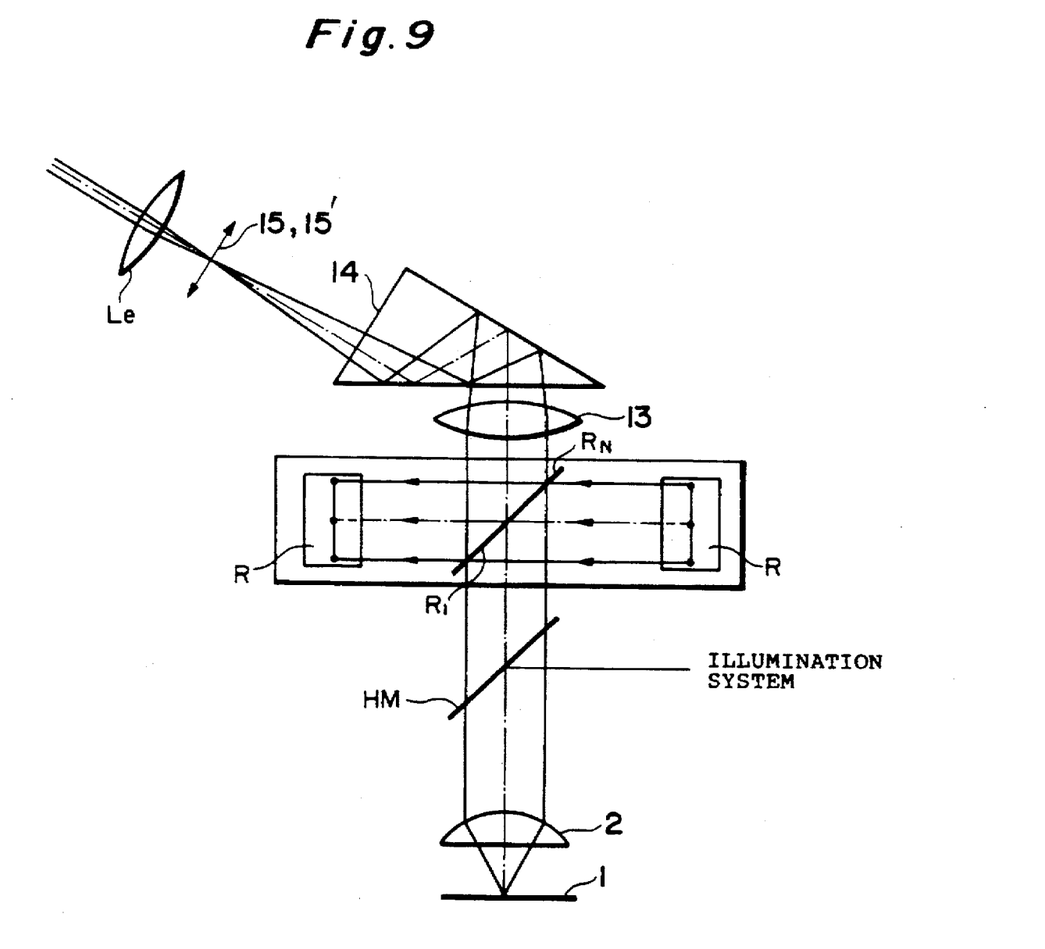
FIG. 9 is a sectional view of the microscope shown in FIG. 8.

FIG. 9 is a sectional view of the microscope shown in FIG. 8. In FIG. 9, the second objective lens 13, the faced-down prism 14, the observation images 15 and 15' and the eyepiece lens Le are shown in the drawing rotated by 90° with respect to the other members to make it easier to understand. In FIG. 9, a half mirror HM introduces illumination light from an illumination system, whereas an eyepiece lens Le further enlarges the observation images 15 and 15'.

Figure 10:
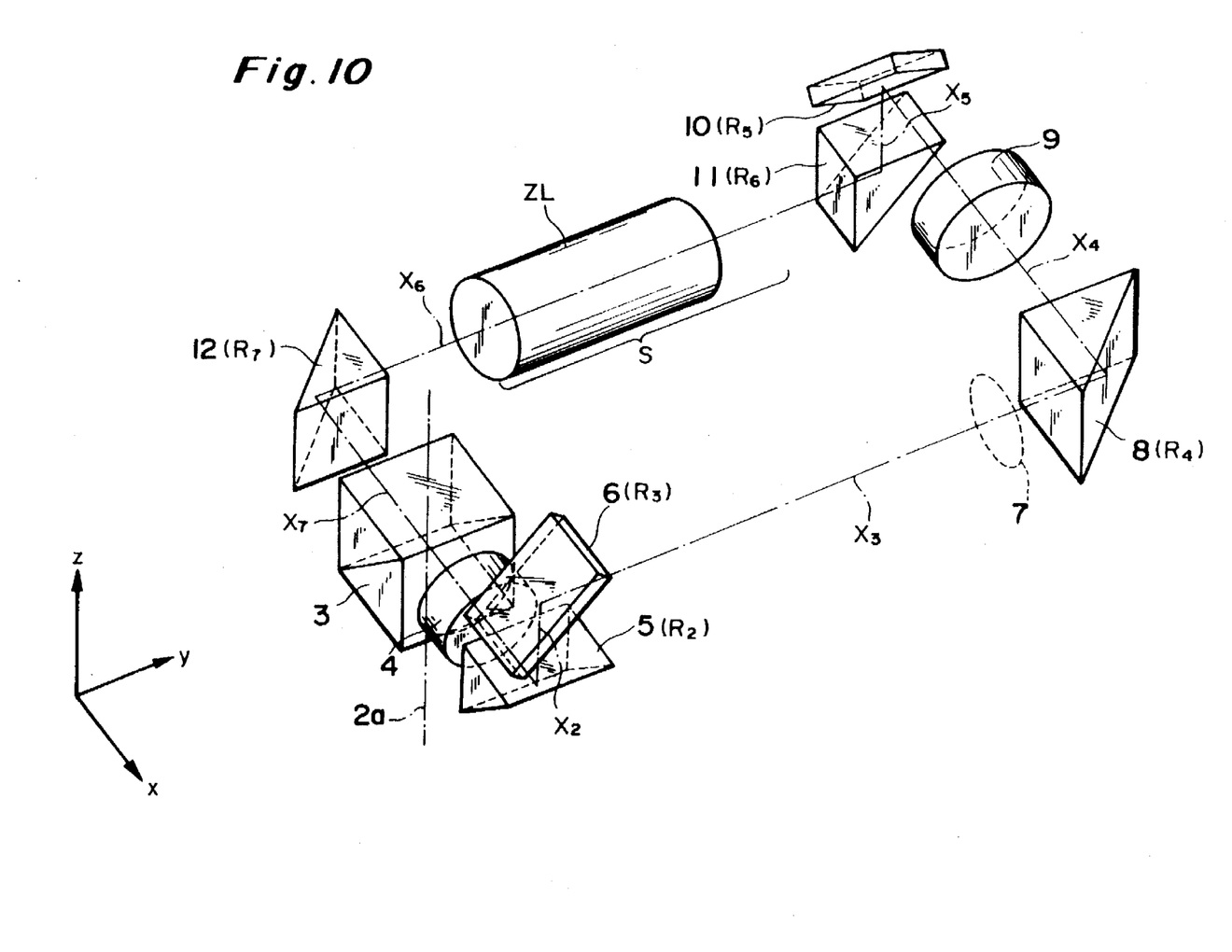
FIG. 10 is a perspective view showing a configuration of a first embodiment of the present invention.

FIG. 10 shows a first embodiment of the intermediate lens barrel in accordance with the present invention. The round optical path of this embodiment is configured as follows. The luminous flux entering the round optical path from the prism 3 initially proceeds in +x direction so as to pass through an imaging lens 4 and then is reflected by a prism 5 into +z direction, namely, enters the second floor. Subsequently, the luminous flux is reflected by a mirror 6 so as to proceed in +y direction on the second floor, forms an intermediate image 7, and then is reflected by a prism 8 so as to proceed in −x direction. Thereafter, the luminous flux is transmitted through a collimator lens 9 so as to be converted into parallel light and then, by means of a mirror 10, made to proceed in −z direction, namely, descends to the first floor. Subsequently, the luminous flux is made to proceed in −y direction on the first floor by means of a prism 11, passes through a space S in which a zoom lens ZL has been inserted, and then is reflected by a prism 12 so as to proceed in +x direction, thereby completing the round optical path.

Since the space S between the prisms 11 and 12 in this embodiment is a parallel system, it is suitable for accommodating an afocal zoom having a high zoom ratio.

Figure 11:
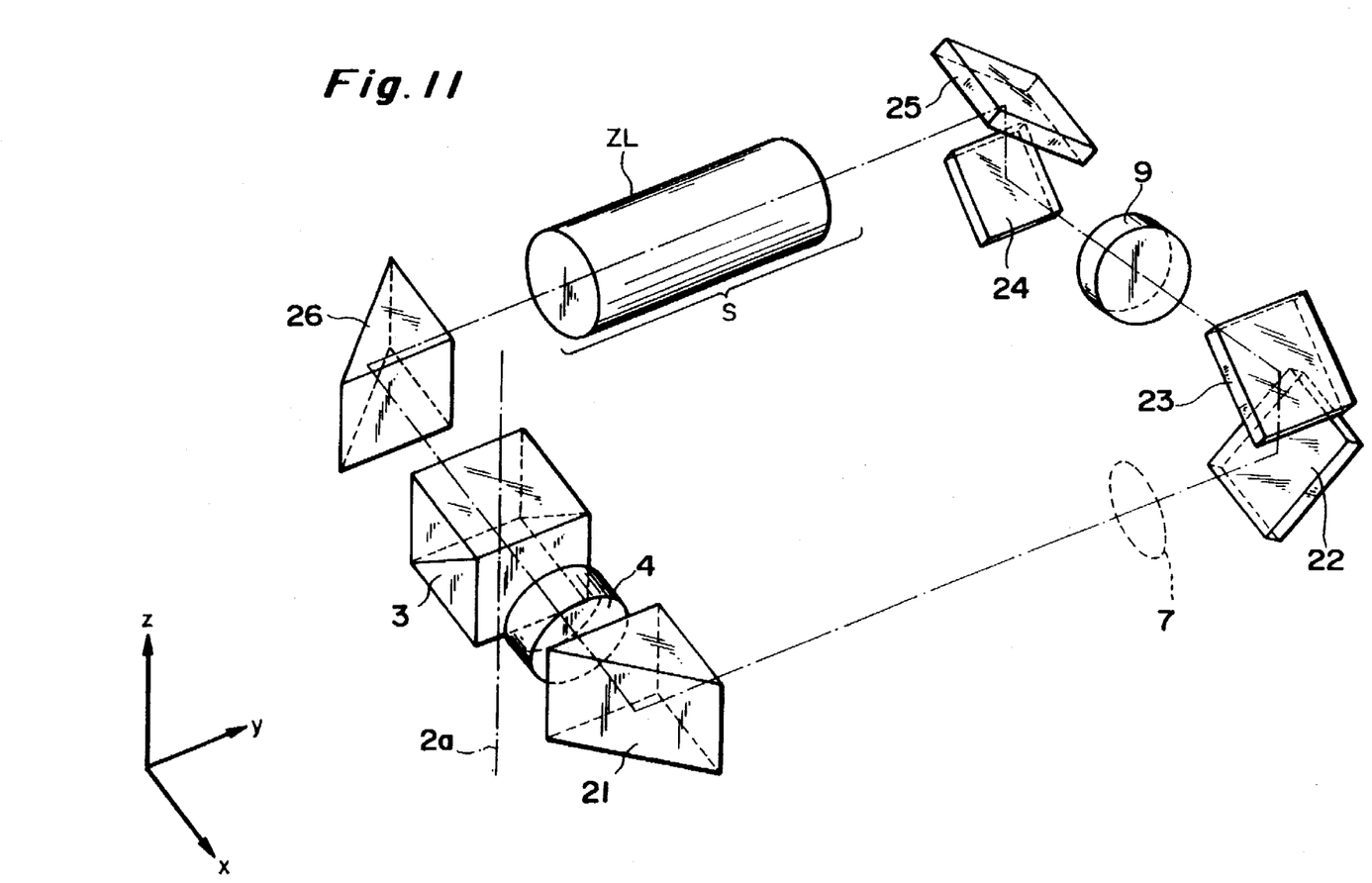
FIG. 11 is a perspective view showing a configuration of a second embodiment of the present invention.

FIG. 11 shows a second embodiment. In this embodiment, the luminous flux entering the round optical path initially proceeds in +x direction so as to pass through the imaging lens 4, then is reflected by a prism 21 so as to proceed in +y direction and form the intermediate image 7, and further is reflected by a mirror 22 so as to proceed in +z direction, i.e., ascends to the second floor. Thereafter, the luminous flux is reflected by a mirror 23 so as to proceed in −x direction as well as in −z direction, namely, gradually descends from the second floor to the basement floor. During this process, the luminous flux is transmitted through the collimator lens 9 so as to be converted into parallel light. Then, the luminous flux is reflected by a mirror 24 so as to proceed in +z direction, namely, ascends from the basement floor to the first floor. Further, the luminous flux is reflected by a mirror 25 so as to proceed in −y direction on the first floor, passes through the space S in which the zoom lens ZL has been inserted, and then is reflected by a prism 26 so as to proceed in +x direction, thereby completing the round optical path.

In this embodiment, since a multilayer portion is formed at a place remote from the observer, the thickness of the intermediate lens barrel at a portion to be inserted into the objective optical axis 2a can be minimized, whereby the eyepoint can be kept low. Also, since the space S between the mirror 25 and the prism 26 constitutes a long parallel system, an afocal zoom having a high zoom ratio can be inserted therein.

Figure 12:
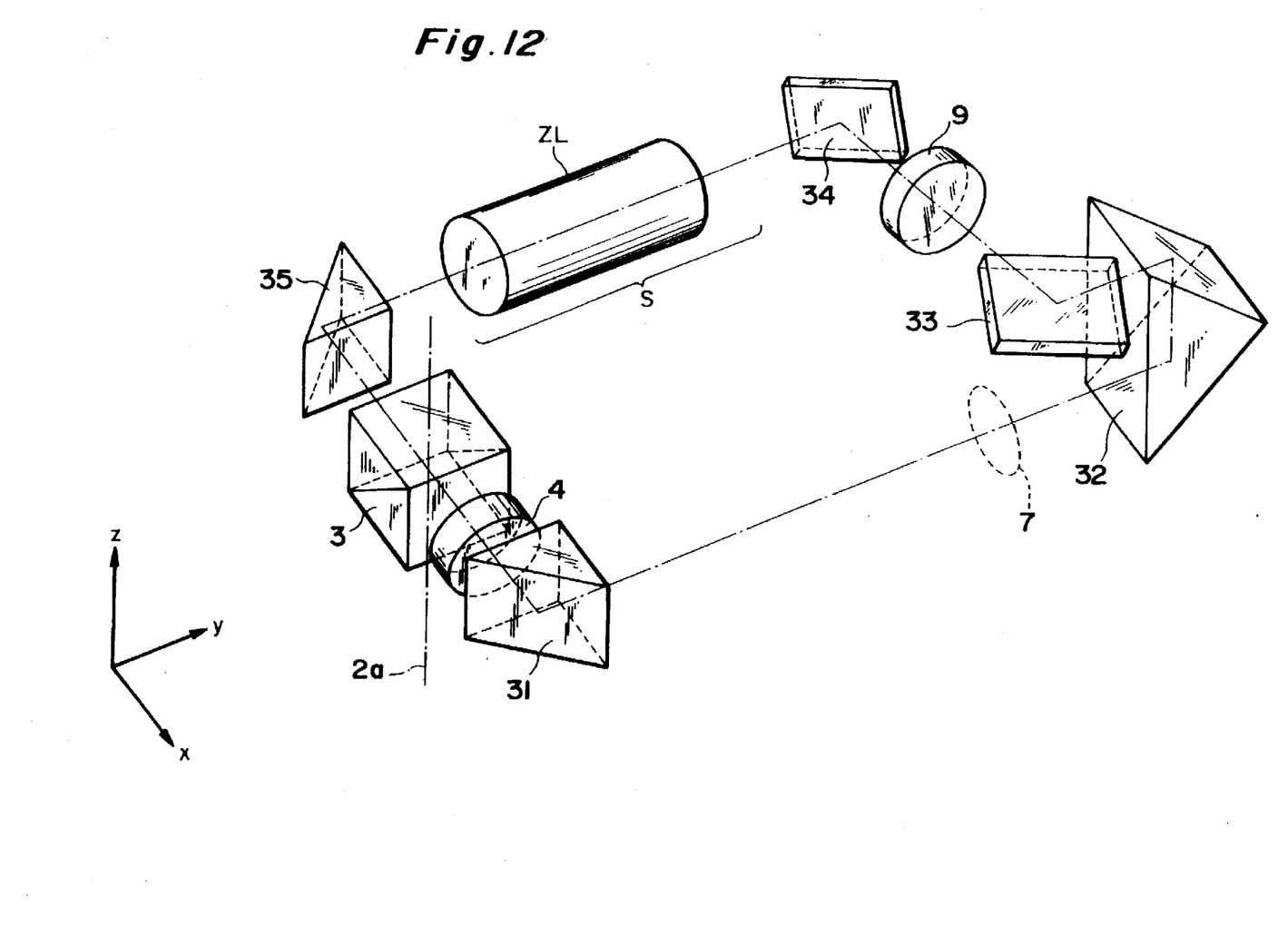
FIG. 12 is a perspective view showing a configuration of a third embodiment of the present invention.

FIG. 12 shows a third embodiment. In this embodiment, the luminous flux entering the round optical path initially proceeds in +x direction so as to pass through the imaging lens 4, then is reflected by a prism 31 so as to proceed in +y direction and form the intermediate image 7, and further is reflected twice in a prism 32. Upon the first reflection, the luminous flux proceeds in +z direction, i.e., ascends to the second floor. Upon the second reflection, the luminous flux proceeds in −y direction on the second floor. Thereafter, the luminous flux is reflected by a mirror 33 so as to proceed in −x direction as well as in −z direction, namely, gradually descends from the second floor to the first floor. During this process, the luminous flux is transmitted through the collimator lens 9 so as to be converted into parallel light. Then, the luminous flux is reflected by a mirror 34 so as to proceed in −y direction on the first floor, passes through the space S in which the zoom lens ZL has been inserted, and then is reflected by a prism 35 so as to proceed in +x direction, thereby completing the round optical path.

While the second embodiment comprises a three-floor configuration made of the first, second, and basement floors as a whole, the third embodiment is formed as a two-floor configuration, whereby the thickness of the multilayer portion is made thinner.

Figure 13:
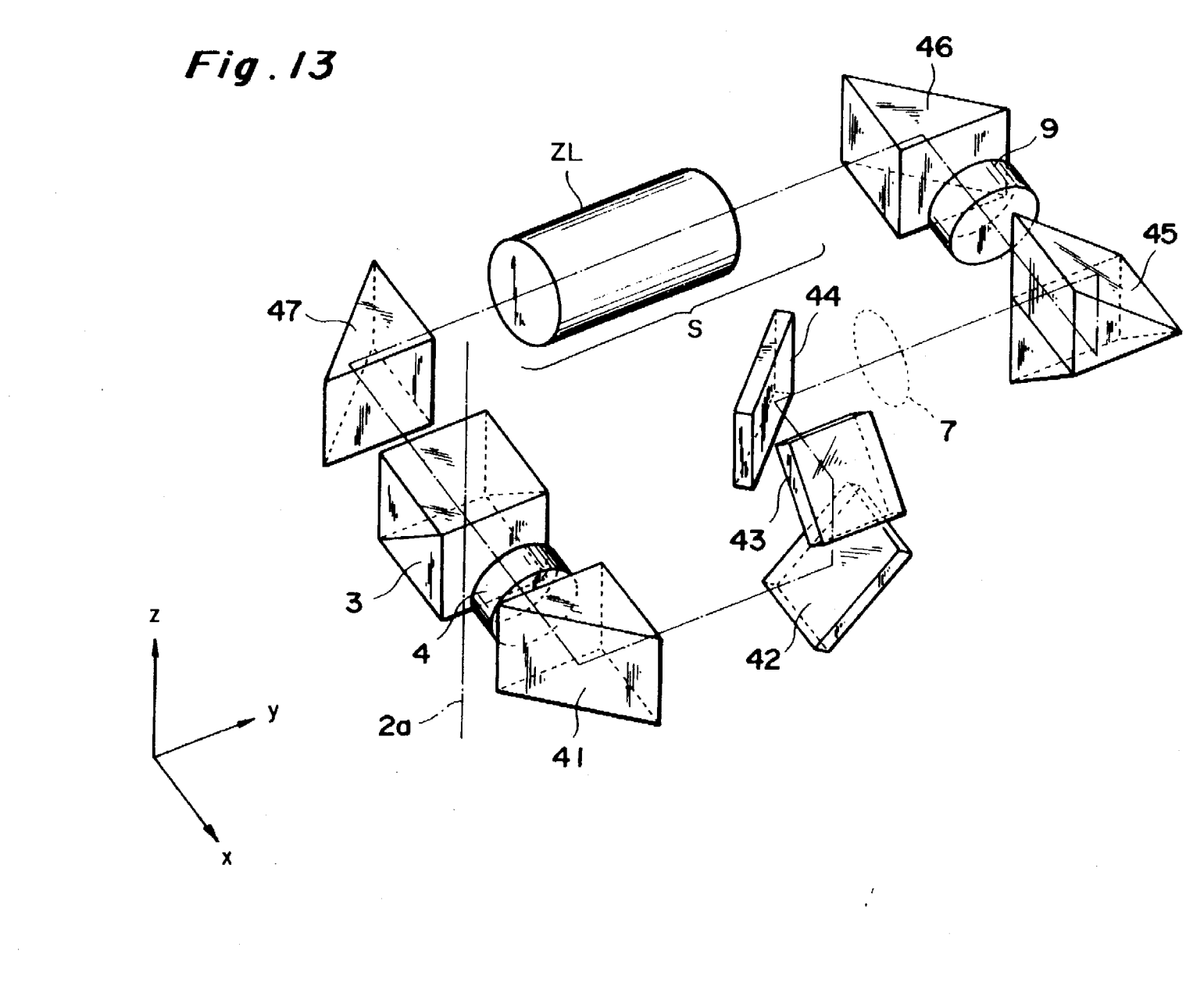
FIG. 13 is a perspective view showing a configuration of a fourth embodiment of the present invention.

FIG. 13 shows a fourth embodiment. In this embodiment, the luminous flux entering the round optical path initially proceeds in +x direction so as to pass through the imaging lens 4, then is reflected by a prism 41 so as to proceed in +y direction, and further is reflected by a mirror 42 so as to proceed in +z direction, i.e., ascends to the second floor. Thereafter, the luminous flux is reflected by a mirror 43 so as to proceed in −x direction on the second floor, then is reflected by a mirror 44 so as to proceed in +y direction and form the intermediate image 7, and further is reflected twice in a prism 45. Upon the first reflection, the luminous flux proceeds in −z direction, i.e., descends to the first floor. Upon the second reflection, the luminous flux proceeds in −x direction on the first floor so as to pass through the collimator lens 9, by which it is converted into parallel light. Then, the luminous flux is reflected by a prism 46 so as to proceed in −y direction, passes through the space S in which the zoom lens ZL has been inserted, and then is reflected by a prism 47 so as to proceed in +x direction, thereby completing the round optical path.

While the luminous flux is reflected only eight times in the round optical path in the above-mentioned first, second, and third embodiments, it is reflected ten times in the round optical path in the fourth embodiment. Namely, while the number of bending operations in the optical path increases in the fourth embodiment, it is advantageous in that the size of the whole system becomes compact thereby.

Table 2 shows the angular change α of the beam spot in each optical axis in the foregoing embodiments. With reference to this table, in the first, second, and third embodiments, excluding the increments and decrements by 360°, the following relationship:

$$(\alpha_1+\alpha_3+\alpha_5+\alpha_7)-(\alpha_2+\alpha_4+\alpha_6\alpha_8)=180°$$

is established. Also, in the fourth embodiment, the following relationship:

$$(\alpha_1+\alpha_3+\alpha_5+\alpha_7\alpha_9)-(\alpha_2+\alpha_4+\alpha_6\alpha_8\alpha_{10})=180°$$

is established. Accordingly, the beam spot advances by 180° with 8 or 10 reflecting surfaces, while advancing by 180° upon one imaging operation. As a result, in each of these embodiments, the direction of the image does not change when passing through the round optical path.

Here, in each of the above-mentioned embodiments, since the first reflecting surface $R_1$ and the last reflecting surface $R_N$ are disposed opposite to each other, the technique of the above-mentioned relationship (5) may also be adopted so as to confirm that the beam spot advances by 180°.

TABLE 2

| Angular change | Embodiment No. | | | |
|---|---|---|---|---|
| | 1 | 2 | 3 | 4 |
| $\alpha_1$ | 180° | −90° | −90° | −90° |
| $\alpha_2$ | +90° | −90° | −90° | −90° |
| $\alpha_3$ | −90° | +90° | 0° | +90° |
| $\alpha_4$ | +90° | 180° | $\alpha_4$ | +90° |
| $\alpha_5$ | −90° | +90° | 180° | −90° |
| $\alpha_6$ | +90° | −90° | 90° − $\alpha_4$ | −90° |
| $\alpha_7$ | −90° | −90° | −90° | +90° |
| $\alpha_8$ | 180° | 180° | 180° | 0° |
| $\alpha_9$ | — | — | — | −90° |
| $\alpha_{10}$ | — | — | — | 180° |

Table 3 shows the image directions of the sample, intermediate image, and observation image in each of the foregoing embodiments. Also, the conventional examples shown in FIGS. 1 and 2 are respectively referred to as Conventional Examples 1 and 2, and the image directions of the sample, intermediate image, and observation image in each of them is shown in Table 3. Of the two intermediate images in the Conventional Example 1, the left side indicates the first intermediate image, whereas the right side indicates the second intermediate image. In each example, the direction of the observation image advances from the sample by 180° due to the formation of the observation image.

TABLE 3

| | Embodiment No. | | | | Comparative Example | |
|---|---|---|---|---|---|---|
| | 1 | 2 | 3 | 4 | 1 | 2 |
| Sample | | | | F | | |
| Intermediate image | ㄴ | ㄲ | ㄲ | ㄱ | ㄲ/ㄴ | ㄲ |
| Observation image | | | | ⌐ | | |

Though the total number N of the reflecting surfaces is 8 or 10 in each of the above-mentioned embodiments, a configuration for advancing the beam spot by 180° can also be attained with N=6. Also, N may be 12 or greater. In order to form a round optical path, however, N cannot be 2.

Figure 14:
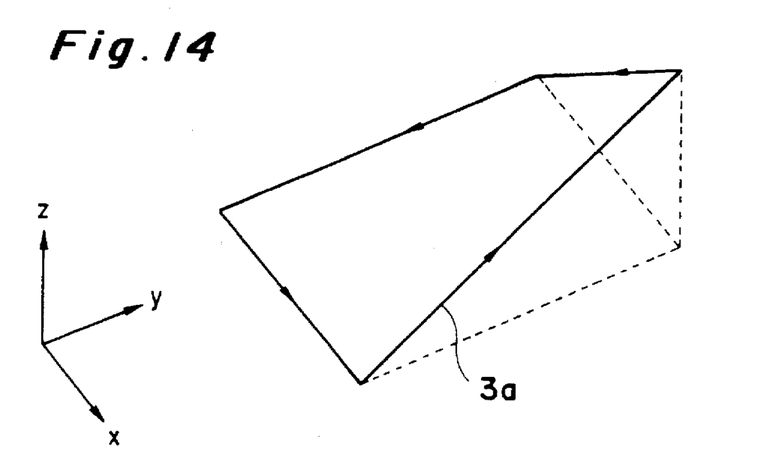
FIGS. 14 to 16 are views showing a schematic configuration of a fifth embodiment of the present invention.
Figure 15:
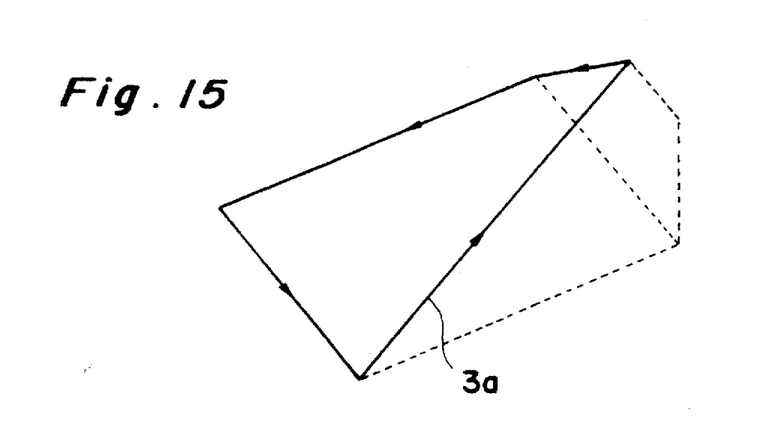

FIGS. 14 and 15 show examples of a round optical path in which N=6. In these drawings, for simplification, only the optical path is shown with no reflecting surfaces being depicted. FIG. 14 shows an example in which the width does not change in +y direction, i.e., depth direction; whereas FIG. 15 shows an example in which the width is narrowed along the depth direction. However, since the first reflecting surface $R_1$ and the last reflecting surface $R_6$ can be inserted into any place on the round optical path, any of these directions can be taken as the depth direction. Accordingly, no positions of these reflecting surfaces $R_1$ and $R_6$ are shown.

Figure 16:
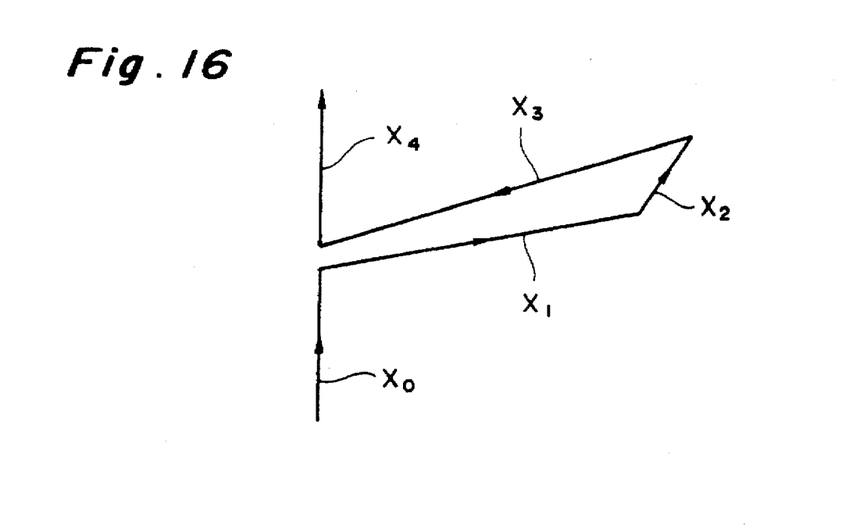

Also, while the first reflecting surface $R_1$ and the last reflecting surface $R_N$ are disposed in parallel to each other in each of the foregoing embodiments, N may be set to 4 when these reflecting surfaces $R_1$ and $R_N$ are not disposed in parallel to each other. FIG. 16 shows an example of this case. In this case, the optical axis $X_2$ is disposed horizontally, thereby making the opening angle of the optical axes $X_1$ and $X_3$ with respect to each other in the height direction and their opening angle in the horizontal plane equal to each other. In order to make these opening angles different from each other, the optical axis $X_2$ is not disposed horizontally. In any case when N=4, however, since the first reflecting surface $R_1$ and the last reflecting surface $R_4$ cannot be disposed opposite to each other, the eyepoint becomes higher thereby.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 198193/1995 filed on Jul. 10, 1995 is hereby incorporated by reference.

What is claimed is:

1. An intermediate lens barrel forming a round optical path for a microscope, said intermediate lens barrel comprising:

a first reflecting surface positioned and adapted to intercept an optical axis of an objective lens of said microscope and reflect a luminous flux from said objective lens;

an N-th reflecting surface for reflecting the luminous flux and directing the luminous flux to a direction of the optical axis of said objective lens, wherein N is an even number not smaller than 4; and second to (N-1)-th reflecting surfaces for reflecting the luminous flux emitted from said first reflecting surface to said N-th reflecting surface, wherein an intermediate image is formed once in the round optical path of said intermediate lens barrel, and wherein an angle $\alpha_1$ formed by projections of respective normals $N_1$ and $N_2$ of said first and second reflecting surfaces with respect to each other, when said normals $N_1$ and $N_2$ are projected onto a plane orthogonal to an optical axis $X_1$ of the luminous flux reflected by said first reflecting surface, is in one of clockwise and counterclockwise directions observed from an exit side of said optical axis $X_1$, an angle $\alpha_2$ formed by projections of respective normals $N_2$ and $N_3$ of said second and third reflecting surfaces with respect to each other, when said normals $N_2$ and $N_3$ are projected onto a plane orthogonal to an optical axis $X_2$ of the luminous flux reflected by said second reflecting surface, is in the one direction observed from an exit side of said optical axis $X_2$, an angle $\alpha_{N-1}$ formed by projections of respective normals $N_{N-1}$ and $N_N$ of said (N-1)-th and N-th reflecting surfaces with respect to each other, when said normals $N_{N-1}$ and $N_N$ are projected onto a plane orthogonal to an optical axis $X_{N-1}$ of the luminous flux reflected by said (N-1)-th reflecting surface, is in the one direction observed from an exit side of said optical axis $X_{N-1}$, an angle $\alpha_N$ by projections of respective normals $N_N$ and $N_1$ of said N-th and first reflecting surfaces with respect to each other, when said normals $N_N$ and $N_1$ are projected onto a plane orthogonal to an optical axis $X_N$ of the luminous flux reflected by said N-th reflecting surface, is in the one direction observed from an exit side of said optical axis $X_N$, and the following relationship is satisfied:

$$(\alpha_1+\alpha_3+\ldots+\alpha_{N-1})-(\alpha_2+\alpha_4+\ldots+\alpha_N)=180°+360°\times n,$$

wherein n is an integer.

2. An intermediate lens barrel according to claim 1, wherein the normal of said first reflecting surface and the normal of said N-th reflecting surface are directed opposite to each other.

3. An intermediate lens barrel according to claim 1, further comprising a zoom lens disposed in said round optical path.

4. An intermediate lens barrel according to claim 3, wherein said zoom lens is disposed between where said intermediate image is formed and where an image is observed by said microscope.

5. An intermediate lens barrel according to claim 1, further comprising an imaging lens disposed in said round optical path for forming said intermediate image, and a collimator lens disposed downstream of said intermediate image.

6. An intermediate lens barrel according to claim 1, wherein the optical axis of the luminous flux passing through said round optical path within said intermediate lens barrel is not contained in a single plane.

7. An intermediate lens barrel according to claim 6, wherein a part of the optical axis of the luminous flux passing through said round optical path within said intermediate lens barrel is in parallel with the optical axis of the luminous flux incident on said first reflecting surface.

8. A microscope for converging a luminous flux from a sample and forming an image of said sample, said microscope comprising:

an illumination optical system for supplying illumination light to said sample;

a first objective lens for converting the luminous flux from said sample into a parallel luminous flux;

an intermediate lens barrel for intercepting the luminous flux emitted from said first objective lens and forming a round optical path; and a second objective lens for intercepting the luminous flux emitted from said intermediate lens barrel, wherein said intermediate lens barrel comprises:

a first reflecting surface positioned to intercept an optical axis of said first objective lens and reflect the luminous flux from said first objective lens;

an N-th reflecting surface for reflecting the luminous flux and directing the luminous flux to a direction of an optical axis of said second objective lens, wherein N is an even number not smaller than 4; and second to (N−1)-th reflecting surfaces for reflecting the luminous flux emitted from said first reflecting surface to said N-th reflecting surface, wherein an intermediate image is formed once in the round optical path of said intermediate lens barrel, and wherein an angle $\alpha_1$ formed by projections of respective normals $N_1$ and $N_2$ of said first and second reflecting surfaces with respect to each other, when said normals $N_1$ and $N_2$ are projected onto a plane orthogonal to an optical axis $X_1$ of the luminous flux reflected by said first reflecting surface, is in one of clockwise and counterclockwise directions observed from an exit side of said optical axis $X_1$, an angle $\alpha_2$ formed by projections of respective normals $N_2$ and $N_3$ of said second and third reflecting surfaces with respect to each other, when said normals $N_2$ and $N_3$ are projected onto a plane orthogonal to an optical axis $X_2$ of the luminous flux reflected by said second reflecting surface, is in the one direction observed from an exit side of said optical axis $X_2$, an angle $\alpha_{N-1}$ formed by projections of respective normals $N_{N-1}$ and $N_N$ of said (N−1)-th and N-th reflecting surfaces with respect to each other, when said normals $N_{N-1}$ and $N_N$ are projected onto a plane orthogonal to an optical axis $X_{N-1}$ of the luminous flux reflected by said (N−1)-th reflecting surface, is in the one direction observed from an exit side of said optical axis $X_{N-1}$, an angle $\alpha_N$ formed by projections of respective normals $N_N$ and $N_1$ of said N-th and first reflecting surfaces with respect to each other, when said normals $N_N$ and $N_1$ are projected onto a plane orthogonal to an optical axis $X_N$ of the luminous flux reflected by said N-th reflecting surface, is in the one direction observed from an exit side of said optical axis $X_N$, and the following relationship is satisfied:

$$(\alpha_1+\alpha_3+ \ldots +\alpha_{N-1})-(\alpha_2+\alpha_4+ \ldots +\alpha_N)=180°+360°\times n,$$

wherein n is an integer.

9. An intermediate lens barrel according to claim 1, further including refracting lenses positioned between the reflecting surfaces, wherein said first to N-th reflecting surfaces form a catoptric system and said refracting surfaces are substantially symmetrical to each other with respect to an optical axis thereof to form a dioptric system.

10. A microscope according to claim 8, further including refracting lenses positioned between the reflecting surfaces, wherein said first to N-th reflecting surfaces form a catoptric system and said refracting surfaces are substantially symmetrical to each other with respect to an optical axis thereof to form a dioptric system.

* * * * *

UNITED STATES PATENT AND TRADEMARK OFFICE
CERTIFICATE OF CORRECTION

PATENT NO. : 5,717,520
DATED : February 10, 1998
INVENTOR(S) : Tatsuro OTAKI, et al.

It is certified that error appears in the above-identified patent and that said Letters Patent is hereby corrected as shown below:

On the title page: item [75] Inventors, delete "Ochi" and insert -- Ouchi --.

Signed and Sealed this

Twenty-third Day of June, 1998

Attest:

BRUCE LEHMAN

*Attesting Officer*    *Commissioner of Patents and Trademarks*